United States Patent [19]

Grachan

[11] Patent Number: 4,856,193

[45] Date of Patent: Aug. 15, 1989

[54] SAW

[76] Inventor: Ronald A. Grachan, 1400 Valley Wind La., Missoula, Mont. 59801

[21] Appl. No.: 304,875

[22] Filed: Jan. 31, 1989

Related U.S. Application Data

[63] Continuation of Ser. No. 77,179, Jul. 24, 1987, abandoned.

[51] Int. Cl.⁴ .............................................. B23D 57/00
[52] U.S. Cl. ...................................... 30/166.1; 30/520; 76/112; 83/853
[58] Field of Search ............ 30/166 R, 502, 520–522, 30/517; 83/851–855; 76/112

[56] References Cited

U.S. PATENT DOCUMENTS

| | | |
|---|---|---|
| 44,561 | 8/1913 | Gouck . |
| 170,202 | 8/1953 | Knapp .................................. D8/95 |
| 234,906 | 4/1975 | Breger .................................. D8/95 |
| 238,758 | 3/1881 | Brooke ................................. 30/520 |
| 270,419 | 1/1883 | Goulton ............................... 30/520 |
| 709,857 | 9/1902 | Anderson ............................. 30/502 |
| 807,227 | 12/1905 | Wuest ................................... 30/502 |
| 2,046,231 | 6/1936 | Alexanders ......................... 30/520 |
| 2,730,792 | 1/1956 | Ronan ................................... 83/852 |
| 3,837,024 | 9/1974 | Saunders .............................. 30/166 |
| 4,624,053 | 11/1986 | Danielsson ....................... 76/112 X |

Primary Examiner—Douglas D. Watts
Attorney, Agent, or Firm—Merchant, Gould, Smith, Edell, Welter & Schmidt

[57] ABSTRACT

A novel saw is disclosed having novel dimensions and tooth pattern for the saw to cut efficiently through bone and wood. The saw includes a plurality of teeth disposed upon the cutting edge of the saw blades. The teeth are set with a bevel of about 3° to 15° and with two steps of about ¼ to ⅓ inch and with a spacing of tip-to-tip between contiguous teeth of about ⅛ to ⅜ inch. The blade is selected of material having dimension and hardness for the blade to yield to bend in a generally semicircular bend.

8 Claims, 2 Drawing Sheets

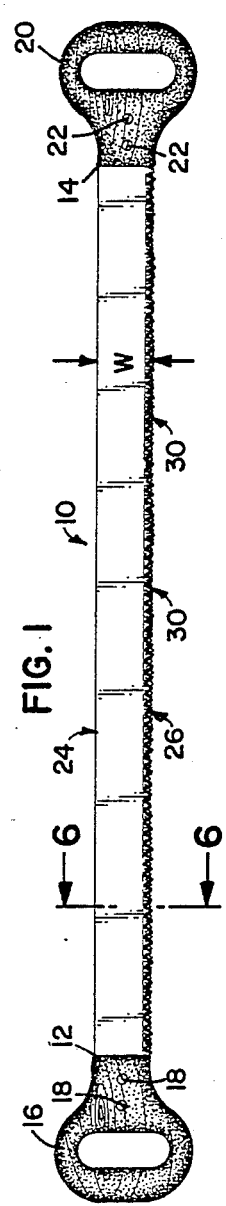
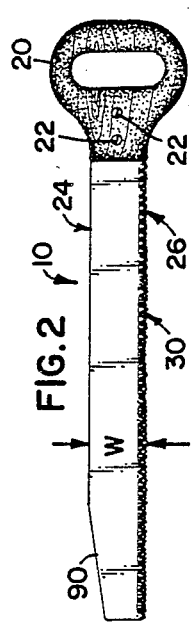
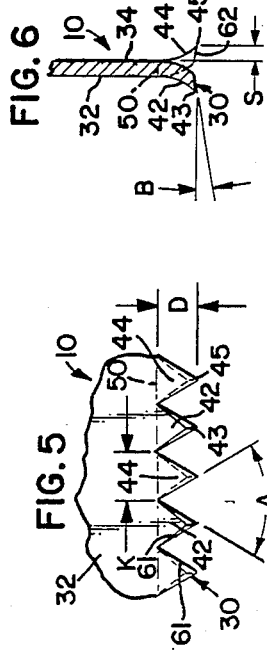
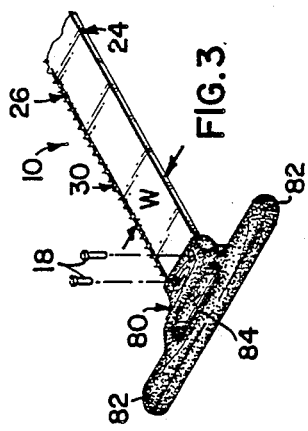
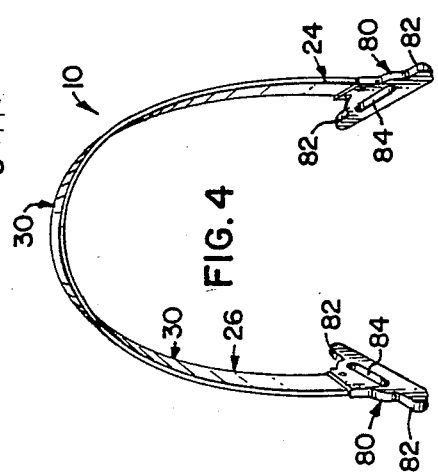

FIG. 7
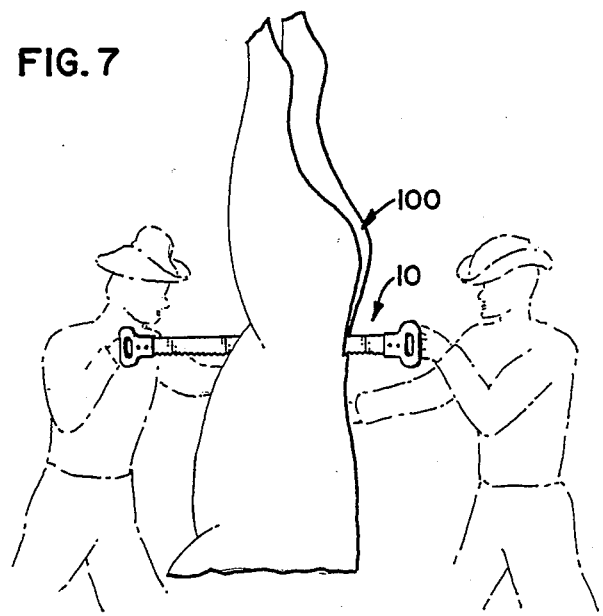
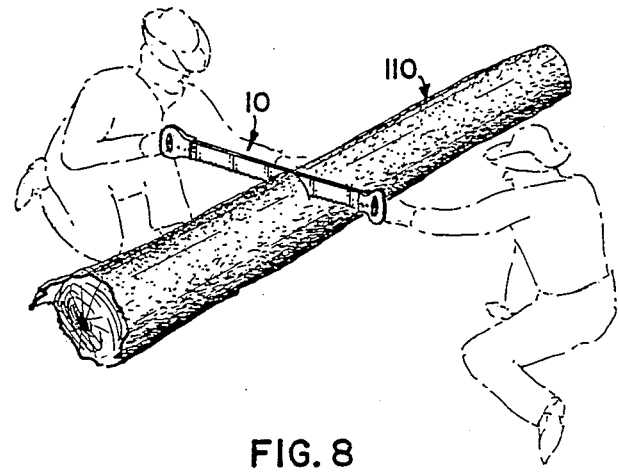
FIG. 8

SAW

This is a continuation of application Ser. No. 07/077,179, filed July 24, 1987, now abandoned.

BACKGROUND OF THE INVENTION

I. Field of the Invention

This invention pertains to saws. More particularly, this invention pertains to a saw with a unique blade pattern for enhancing the versatility of the saw.

II. Background of the Invention

The serious sportsman or woodsman travels in remote areas when hunting and camping. Accordingly, such an individual must be accompanied by all tools, the use of which is reasonably anticipated. A constraint imposed upon the sportsman is the need to travel lightly and compactly.

Sawing is a task commonly addressed by the sportsman. As a result, the art is crowded with numerous saw designs. One such design is shown in U.S. Pat. No. 3,837,024 to Saunders, dated Sept. 24, 1974 (the "Saunders patent"). The Saunders patent teaches a saw having multiple cutting edges with different tooth patterns. The Saunders patent also teaches other uses for the saw including hammer features.

A common sawing task for the hunter is to saw wood as well as game. In sawing game, the saw must cut through both bone and meat. Prior art saws have not proven adequate for the sawing tasks faced by a hunter. For example, prior art saws which cut quickly through wood have not proven efficient in cutting through bone and vice versa. Further, prior art saws, especially saws intended for two-man operation have been cumbersome to pack and carry.

OBJECTS AND SUMMARY OF THE INVENTION

It is an object of the present invention to provide a saw for use by a sportsman. It is a further object of the invention to provide a saw which is efficient for cutting both wood and bone. A still further object of the present invention is to provide a saw which travels in a compact form.

According to a preferred embodiment of the present invention, a saw is provided having a planar blade with a cutting edge. A handle is secured to the blade and a plurality of saw teeth are disposed along the cutting edge in a predetermined pattern. Each of the teeth extend from a base to a tip. Tips of the teeth are set out from side walls of the blade and have teeth edges set at a bevel of about 3° to 15°. The teeth have a depth measured from base to tip of about ¼ to ⅛ inch and a spacing of tip-to-tip between contiguous teeth of about ⅛ to ⅜ inch. The saw is dimensioned to freely bend in a semicircular format to fit around a knapsack.

BRIEF DESCRIPTION OF THE DRAWINGS

FIG. 1 is a top plan view of a saw according to the present invention;

FIG. 2 is an alternate embodiment of the saw of FIG. 1;

FIG. 3 is an alternate embodiment of a handle for a saw of the present invention;

FIG. 4 is a view taken in elevation of the saw of FIG. 1 showing the saw bent in a semicircular format;

FIG. 5 is an enlarged plan view of the tooth pattern of the saw of the present invention;

FIG. 6 is a view of the saw blade taken along line 6—6 of FIG. 1;

FIGS. 7 and 8 are perspective views showing use of the saw of the present invention.

DESCRIPTION OF THE PREFERRED EMBODIMENT

Referring now to FIGS. 1, 4–6, the saw of the present invention will now be described with reference to a preferred embodiment. The saw includes a blade 10 extending from a first end 12 to a second end 14. A first handle 16 is secured to end 12 by bolts 18. Similarly, a second handle 20 is secured to second end 14 by bolts 22.

As shown in the drawings, blade 10 is elongate with a flat edge 24 and a cutting edge 26. Cutting edge 26 includes a plurality of teeth 30.

The dimensions and material of blade 10 and the pattern of teeth 30 are unique in combination and provide for extraordinary benefits not enjoyed or suggested by the prior art. Specifically, blade 10 is formed from Swedish saw steel having a Rockwell hardness of 42 and selected to have a thickness of 15 to 18 gauge with 15 gauge being preferred. Further, the width of the blade (indicated by dimension W) is selected preferably 2 inches. The selection of this gauge and width permits the saw of FIG. 1 to be bend in a semicircular fashion such as that shown in FIG. 4. With a saw having a blade length of about 36 inches (as is preferred) the saw may be readily bent to conform to the exterior shape of a pack horse or knapsack. This makes for compact storage of the saw and easy transport action while camping or through other uses.

The tooth pattern of the saw is best shown in FIGS. 5 and 6. As shown in the figures, the plurality of teeth 30 are all offset from the side of the blade 10. For example, with reference to FIG. 6, the blade 10 includes first and second side walls 32 and 34, respectively. Each of the teeth 30 are alternately offset such that they extend beyond side walls 32 and 34. For convenience, the teeth which are offset from side wall 32 will be conveniently referred to as teeth 42 and the teeth which are offset from side wall 34 will conveniently be referred to as teeth 44. Teeth 42 terminate at tips 43 and teeth 44 terminate at tips 45. All teeth 30 extend from a common base line 50.

The amount of offset of all teeth are the same. The amount of offset is measured as the distance between the plane of the blade side walls 32, 34 and the furthest extension of the tips of the blades 42, 44. This offset is shown by the dimension S and, in a preferred embodiment, is 1/16 inch.

The novel tooth pattern of the present invention also provides for a bevel B being provided. The bevel is conveniently measured as the angle of teeth edges 61 to the flat face of the teeth. In a preferred embodiemnt, the bevel B is an angle between 3° and 10°.

The novel tooth pattern of the present invention includes a dimension of the depth D of the teeth 30 being set to be between ¼ and ⅛ inch with a preferred depth being 3/16 inches. The depth is measured as the distance between the base line 50 of the teeth and tips 43, 45. Further, the novel tooth pattern further includes a dimension whereby contiguous teeth are spaced apart a distance of about preferably ¼ inch measured base-to-base or tip-to-tip and is indicated by the dimension K in FIG. 5. Finally, the teeth are cut such that opposing teeth edges 61 define an angle A preferably measured to be about 60°.

With a saw blade having a tooth pattern and the dimensions described above, I have found that there is surprising performance benefit of the saw of the present invention over prior art. Namely, a saw having such a structure can efficiently saw through both bone and wood in a manner not even closely approached by the prior art. This use of the saw is shown in both FIG. 7 and FIG. 8. In FIG. 7, the saw is being used to cut through game. In this process, the saw is cutting through both bone and meat. In FIG. 8, the saw is being used to cut through a log. It has been found that the saw of the present invention can efficiently and quickly cut through both with minimum effort on the part of the saw operators.

Referring now to FIGS. 2 and 3, alternative embodiments of the present invention are shown. In FIG. 3, an extended handle 80 is shown having projecting side grips 82. Handle 80 is particularly adapted for use in a two-man operation where an operator can grasp either the centrally located handle opening 84 with one hand or, alternatively grasp the extended handle portions 82 with both hands.

In FIG. 2, the saw of FIG. 1 has been shortened by cutting the saw in half and terminating the blade at a tapered free end 90 for strength and clearance. However, the tooth pattern of the saw remains the same.

From the foregoing detail description of the present invention, it has been shown how the objects of the invention have been attained in a preferred manner. However, modifications and equivalents of the disclosed concepts, such as readily occur to those skilled in the art, are intended to be included in the scope of this invention. Thus, the scope of the invention is intended to be limited only by the scope of the claims as are, or may hereafter be, appended hereto.

I claim:

1. A saw adapted for a plurality of uses including sawing wood and bone, comprising:
   a planar blade having a cutting edge;
   a handle secured to said blade;
   a plurality of saw teeth disposed on said cutting edge in a predetermined pattern with each of said teeth extending from a base to a tip, said tips of said teeth set from side walls of said blade by a predetermined amount, said teeth having a depth measured from a base to tip of about $\frac{1}{4}$ to about $\frac{3}{8}$ inch and a spacing of tip-to-tip between contiguous teeth of about $\frac{1}{8}$ to $\frac{3}{8}$ inch;
   said saw including teeth alternately set away from opposite sides of said blade with teeth curving from said blade to said tips and with blade tips provided with a slope
   said teeth are provided with said slope set at a bevel of 3° to 15°.

2. A saw according to claim 1 wherein opposing edges of contiguous teeth define an angle of about 60°.

3. A saw according to claim 1 wherein said set equals about 1/6 inch.

4. A saw according to claim 1 wherein said blade is selected to have a length extending between free ends of said blade, said length selected for said blade to be flexed in a semicircular arc.

5. A saw according to claim 1 wherein said blade has a width of about 2 inches.

6. A saw according to claim 1 wherein said blade is formed of steel of predetermined gauge having a selected hardness of about Rockwell 42.

7. A saw according to claim 5 wherein said gauge is preferably 18 gauge.

8. A saw according to claim 1 wherein said bevel is 10°.

* * * * *

UNITED STATES PATENT AND TRADEMARK OFFICE
CERTIFICATE OF CORRECTION

PATENT NO. : 4,856,193

DATED : August 15, 1989

INVENTOR(S) : Ronald A. Grachan

It is certified that error appears in the above-identified patent and that said Letters Patent is hereby corrected as shown below: Title page:

In the Abstract, line 7, "continguous" should be --contiguous--;

Column 2, line 27, "bend" should be --bent--;

Column 2, line 57, "embodiemnt" should be --embodiment--; and

Column 4, claim 7, line 33, "A saw according to claim 5" should be --A saw according to claim 6--.

Signed and Sealed this

Seventeenth Day of April, 1990

Attest:

HARRY F. MANBECK, JR.

*Attesting Officer*  *Commissioner of Patents and Trademarks*